Figure 1:
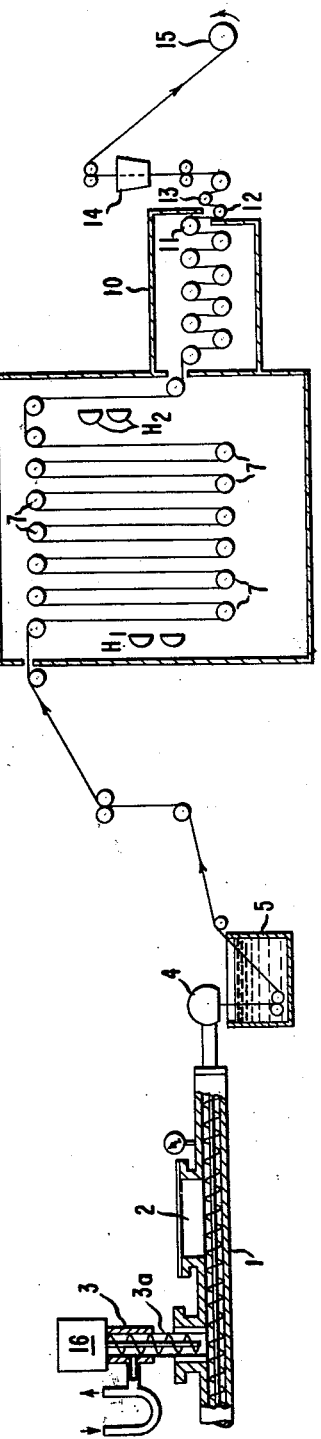
Figure 2:
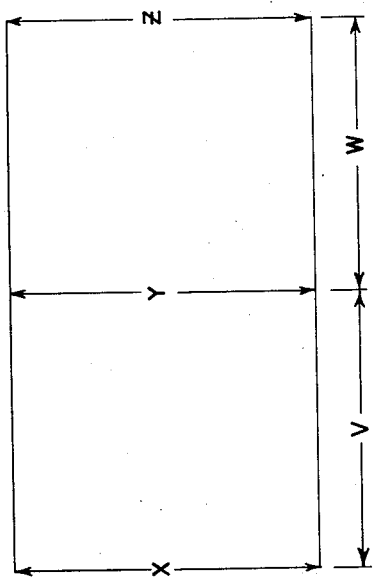

Dec. 18, 1962 W. H. LINTON, JR., ET AL 3,068,525
PROCESS FOR THE PRODUCTION OF DIMENSIONALLY
STABLE POLYVINYL RESIN SHEETING
Filed Aug. 28, 1958

INITIAL DIMENSIONS:

$X = Y = Z = 10.00$ IN.
$V = W = 9.00$ IN.

AFTER ANNEALING (30 MIN. AT 71° C):

$$\text{SHRINKAGE} = \left(\frac{10-Y}{10}\right) 100, \%$$

$$\text{SKEW} = \left(\frac{X-Z}{10}\right) 100$$

$$\text{LAY FLAT} = \frac{(X-Y)}{10} 100$$

INVENTORS
WILLIAM H. LINTON, JR.
STANLEY H. MUNGER

BY

ATTORNEY

United States Patent Office
3,068,525
Patented Dec. 18, 1962

3,068,525
PROCESS FOR THE PRODUCTION OF DI-
MENSIONALLY STABLE POLYVINYL RESIN
SHEETING
William Henry Linton, Jr., Wilmington, Del., and Stanley Hiram Munger, Rumson, N.J., assignors to E. I. du Pont de Nemours and Company, Wilmington, Del., a corporation of Delaware
Filed Aug. 28, 1958, Ser. No. 757,766
7 Claims. (Cl. 18—48)

This invention relates to a process for the thermal treatment of plastic sheeting and more particularly relates to producing polyvinyl acetal sheeting having improved dimensional stability.

Film, sheeting and other attenuated products from the various types of polyvinyl acetal resins, as prepared from acetals derived from various aldehydes with polyvinyl alcohols or partially hydrolyzed polyvinyl esters, have been employed in the manufacture of film base, sheeting and like products. In general, such resins are capable of being cast or extruded by processes analogous to those used in the manufacture of film and sheeting from cellulose derivatives. Due, however, to their tendency to shrink during storage and handling before fabrication into laminated glass or other products, uneconomical scrap losses result.

Methods have been proopsed for post treatment of thermoplastic film or sheets in order to cure or otherwise stabilize the plastic. Other methods include physical treatments of the formed sheet to remove low boiling constituents. A method for stress relieving plastic is described in U.S. Patent 2,317,409, issued April 27, 1943, which involves thermal heating following by quenching the formed plastic. A method of curing synthetic resin films is shown in U.S. Patent 2,241,225, issued May 6, 1941, by means of which a drum cast sheet is subjected to treatment in liquid baths followed by controlled drying of the resulting films. These methods, however, do not alleviate the shrinkage of polyvinyl butyral films to the extent required to satisfy the precise specifications of laminated glass fabricators and other uses requiring dimensional stability.

An object of the present invention is to improve the dimensional stability of polyvinyl acetal resin sheets. Another object is to provide a process of treating such thermoplastic sheets by stress relaxation followed by strain recovery. Yet another object is to provide, as new compositions of matter, polyvinyl acetal resin sheets having greatly improved dimensional stability.

When polyvinyl acetal resins and especially plasticized polyvinyl butyral resins, in the molten state, are extruded from a slit die, drawn down to a thickness used for safety glass interlayer and chilled, stresses are frozen into the sheet. These stresses cause the sheet to change its dimensions during later operations. If the sheet is taken directly from the quench tank and dried unrestrained, it may become about 50% shorter, 30% wider and 50% thicker. The amount of dimensional change depends on the characteristics of the polymer and the conditions under which it is extruded and drawn.

The invention will be readily appreciated by reference to the drawing wherein a polyvinyl acetal sheet is subjected to thermal treatment to give a processed sheet having a shrinkage of 6% to 4% or less. FIGURE I of the drawing diagrammatically illustrates preferred equipment in which the process of the invention is conducted. FIGURE II illustrates the method used for measuring the shrinkage of the sheet produced. Shrinkage is measured by the dimensional changes in a sheet which has been permitted to relax freely at 71° C. for 30 minutes.

A reduced pressure extruder 1, available on the open American market, provided with reduced pressure (extraction) section 2 and a screw dewatering section 3 and screen 3a, is provided with a conventional sheeting die 4. Polyvinyl acetal polymer fed to extruder 1 and formed by die 4 into a sheet passes through quench tank 5 from which the quenched sheet is directed by rolls into heating chamber 6 provided with rolls 7 and heaters $H_1$ and $H_2$. From the heating chamber 6 the sheet is passed by rolls 7 into the shrinking section 10 and around the rolls shown after which the processed film passes over rolls 11 and chill rolls 12 and 13, through the powderer 14 to the wind-up 15.

In the operation of the process a polyvinyl butyral flake composition containing from 15% to 33% of a plasticizer such as dibutylcellosolve adipate, dibutyl sebacate or triethylene glycol di-2-ethyl butyrate is passed into hopper 16 of the extruder 1. It is heated to the molten state between 150 and 210° C. and discharged from a pressure of between 300 to 600 p.s.i. into the quenching bath 5 containing water at a temperature of 35° C. or below. The sheet then passes over the rolls shown, into the heating chamber 6 and as the sheet passes the radiant heaters $H_1$, it is quickly brought up to the temperature of the heating chamber 6, i.e., between 80° C. and 100° C., time of passage through the heating chamber 6 ranging between 5 and 15 minutes and preferably between 8 and 12 minutes. This treatment, conducted with the sheet dimensions held substantially constant, results in a partial relaxation up to about 20 percent, although a relaxation of about 10 percent is preferred. While in the chamber, the sheet is passed from one roll to the next operating at constant peripheral velocity.

Chamber 6 thus, besides acting as a dryer, equalizes stresses in the sheet and decreases their intensity, i.e., reduces the "memory" which the sheet possesses as a result of the shearing and stretching in the extruder 1, the extrusion die 4, the draw-down zone between the die 4 and the bath 5. Such treatment constitutes an equalizing and partial stress relaxation operation, i.e., the stresses resulting from the prior history of the sheet.

As the sheet passes from the heating chamber 6 its temperature is raised by radiant heaters $H_2$ to substantially the temperature of the shrinking section 10 which is maintained between 110° C. and 130° C., the sheet passing through chamber 10 in from 0.5 to 3 minutes, preferably in 1.5 to 2.0 minutes. Temperatures equal to or lower than those of chamber 6 may be used if desired, in which case a longer time is required. In shrinking section 10 the sheet is allowed to shrink from about 25% up to about 35% of its original longitudinal dimension thereby growing wider and thicker under gradually diminishing tension as it passes over the rolls positioned as shown at about ⅓ the vertical distance of the heating chamber 6 rolls and operating at gradually decreased peripheral velocity. For the treatment of a sheet about 50″ wide, the top shrinking section rolls are about 10 to 14 inches and preferably 12 inches from the bottom rolls. Treatment in the shrinking section 10 constitutes strain recovery, the percent of sheet shrinkage being a practical measure of that recovery. One or more rolls at the top or bottom of section 10 are bowed, preferably in a horizontal plane, the center of the bow projecting toward the exit end of section 10 or in any other suitable direction to prevent wrinkling of the film and to improve lay-flat.

When the sheet passes from the shrinkage section it is chilled on rolls 12 and 13, maintained at a temperature of 40° C. or below, to freeze the established dimensions of the sheet.

Not only does the process of the invention markedly reduce shrinkage of the sheet to a minimum but it also markedly improves skew and poor lay-flat which cause difficulties in many important uses. The unskewed sheet will travel over drier rolls without "walking" to the side and can be wound up evenly on the rolls. Moreover, sheets with good lay-flat do not buckle when laid between sheets of glass. The product of the invention possesses those desirable properties.

Neither stress relaxation alone nor strain recovery alone has been found practical to give sheets having low shrinkage values, acceptable skew, or lay-flat. Extensive research has shown that reduction of stresses to less than 6% shrinkage by stress relaxation alone would require exorbitant investment. Depending on the stresses originally present in the sheeting, it is indicated that contact times 4–20 times as great as in the process herein described would be required. Cost would be further increased by the requirement that a relatively large proportion of this long residence period would be spent in passing sheeting between rolls spaced at minimum height (1 foot) in order to attain the final low degree of stresses.

While a strain recovery process alone would require much less contact time, operation involves the following disadvantages:

(a) On release of tension the sheeting increases in thickness as well as width. Any increase in thickness at this stage requires an increase in draw-down at the die which in turn introduces higher stresses in the sheeting and increased relaxation requirements. In other words, strain recovery tends to work against itself to a certain extent in the overall process.

(b) If sheeting from the die is allowed to recover its strain under no tension, it will curl up, i.e., it would be impossible to operate by strain recovery alone to obtain sheeting which is satisfactory from the standpoint of skew and lay-flat.

(c) Even reasonable approach to efficient operation of a strain recovery process would require delicate speed adjustments on the rolls, balancing tension required to equalize stresses against efficiency of recovery. In practice this would undoubtedly involve a great deal of attention since even minor changes in extrusion conditions affect relaxation characteristics of the sheeting.

The process in issue depends on balancing these unfavorable features of the two codependent operations. By their coaction excessive investment is avoided and at the same time a minimum effort required to obtain a high quality product having less than 6% shrinkage.

An important feature of the process is the method of taking off sheeting from the last relaxer roll to the chill roll. It has been established that this is particularly so when low degrees of shrinkage are sought. The preferred method of operation is to chill after a downward pass of about one foot after the last high strain recovery roll 11.

The table illustrates, by way of examples, the outstanding results obtained by producing and treating plasticized polyvinyl butyral resin sheets in accord with the invention.

halohalides, synthetic rubbers such as neoprene, olefin polysulfides, polybutadiene and copolymers of butadiene with styrene, or acrylonitrile, and vinyl plastics, polystyrene, polyacrylic esters, copolymers of vinyl acetate with vinyl chloride, etc. The dimensionally stabilized sheets of the invention are especially valuable for use as interlayers in safety glass and for other uses where a substantially shrinkless thermoplastic should be used.

We claim:

1. In a process of reducing the shrinkage and skew and improving the lay-flat of a polyvinylacetal resin sheet, the steps which comprise subjecting a stressed, extruded sheet of a polyvinylacetal resin to thermal treatment, at a temperaure between 80° C. and 100° C. for 5 to 15 minutes, while said sheet is held at substantially constant dimensions until the stress is equalized and partially relaxed, shrinking the thus relaxed sheet, at a temperature between 110° C. and 130° C. for 0.5 to 3 minutes, and thereafter freezing the sheet as shrunk and thereby obtaining a dimensionally stabilized sheet.

2. In a process of reducing the shrinkage and skew and improving the lay-flat of plasticized polyvinyl butyral sheets, the steps which comprise subjecting a stressed, extruded sheet of plasticized polyvinyl butyral to thermal treatment, at a temperature between 80° C. and 100° C. for 5 to 15 minutes, while said sheet is held at substantially constant dimensions until the stress is equalized and partially relaxed, shrinking the thus relaxed sheet, at a temperature between 110° C. and 130° C. for 0.5 to 3 minutes, and thereafter freezing the sheet as shrunk and thereby obtaining a dimensionally stabilized sheet.

3. The process of claim 1 in which the stress is equalized and partially relaxed for from 8 to 12 minutes.

4. The process of claim 1 in which the shrinking step is conducted for from 1.5 to 2.0 minutes.

5. A process for the production of polyvinyl acetal resin sheet having increased dimensional stability which comprises: extruding polyvinyl acetal resin in the form of a flat sheet, equalizing and partially relaxing the stresses in said flat sheet up to about 20 percent by heating said sheet to a temperature between 80° C. and 100° C. for 5 to 15 minutes while said sheet is maintained at constant dimensions; subjecting the thus partially relaxed sheet to a strain recovery operation during which operation the sheet is shrunk from about 25 percent up to about 35 percent of its original longitudinal dimension by heating to a temperature about the same as the stress relaxing temperature for from 0.5 to 3 minutes; and thereafter freezing said sheet at its newly established dimensions.

6. In a process of reducing the shrinkage and skew and improving the lay-flat of an extruded, stressed polyvinyl butyral resin sheet, the steps which comprise: equalizing and partially relaxing the stresses up to about 20 percent by heating to a temperature of between 80° C. and 100° C. for 5 to 15 minutes, while maintaining

*Table*

| | Extruder | | | Temperatures (° C.) | | | Roll speed (Ft./min.) | | | Shrink[1] Percent | Skew[1] Percent | Flat[1] Percent |
|---|---|---|---|---|---|---|---|---|---|---|---|---|
| | Speed, r.p.m. | Die, p.s.i. | Die, °C. | (5) Q.T. water | (6) drier | (10) shrink section | (5) quench tank | (6) Drier | (10) shrink section | | | |
| 1 | 100 | 395 | 156 | 10.0 | | | | | 10.0 | 3.3 | 1.7 | 1.1 |
| 2 | 100 | 365 | 157 | 11.0 | | | | | 10.0 | 3.5 | 1.7 | 1.2 |
| 3 | 101 | 375 | 158 | 10.0 | | | | | 10.0 | 5.3 | 1.9 | 1.7 |
| 4 | 100 | 355 | | 10.0 | 98 | 95 | 11.2 | 10.7 | 9.7 | 3.2 | 1.7 | 1.1 |
| 5 | 70 | 560 | 166 | 21.0 | 98 | 100 | 7.7 | 7.8 | 8.3 | 2.4 | 0.2 | 0.1 |
| 6 | 70 | 558 | 166 | 19.5 | 100 | 98 | 7.0 | 7.0 | 7.5 | 2.2 | 0.2 | 0.2 |

[1] Percent shrink, skew and flat are determined as shown in FIG. II of the drawing.

The method of the invention while directed especially to the polyvinylacetals is applicable to a variety of other similar anisotropic thermoplastic materials such as rubber, said sheet at constant dimensions; subjecting the thus partially relaxed sheet to a strain recovery operation during which operation the sheet is shrunk from about 25 percent up to about 35 percent of its original longitudinal dimension by heating to a temperature between 110° C. and 130° C. for 0.5 to 3 minutes; and then freezing the sheet at its new dimensions at a temperature below 40° C.

7. In a process of reducing the shrinkage and skew and improving the lay-flat of an extruded, stressed polyvinyl butyral resin sheet, the steps which comprise: equalizing and partially relaxing the stresses up to about 20 percent by heating said sheet to a temperature between 80° C. and 100° C. for 5 to 15 minutes while maintaining said sheet at constnat dimensions; subjecting the thus partially relaxed sheet to a strain recovery operation during which operation the sheet is shrunk from about 25 percent up to about 35 percent of its original longitudinal dimension by heating to a temperature about the same as the stress relaxing temperature for 0.5 to 3 minutes; and thereafter freezing said sheet at its newly established dimensions.

References Cited in the file of this patent
UNITED STATES PATENTS

| | | |
|---|---|---|
| 2,148,062 | Esselen | Feb. 21, 1939 |
| 2,177,659 | Kimble et al. | Oct. 31, 1939 |
| 2,216,461 | Smith et al. | Oct. 1, 1940 |
| 2,241,225 | Talbot | May 6, 1941 |
| 2,260,501 | Wynd | Oct. 28, 1941 |
| 2,290,180 | Hershberger | July 21, 1942 |
| 2,325,060 | Ingersoll | July 27, 1943 |
| 2,373,215 | Young | Apr. 10, 1945 |
| 2,434,231 | Seitz | Jan. 6, 1948 |
| 2,517,570 | Irons | Aug. 8, 1950 |
| 2,517,581 | Lowry et al. | Aug. 8, 1950 |
| 2,603,838 | Lowry et al. | July 22, 1952 |
| 2,743,994 | Chaney et al. | May 1, 1956 |
| 2,926,065 | Coplan et al. | Feb. 23, 1960 |